United States Patent
Liu et al.

(10) Patent No.: US 10,893,281 B2
(45) Date of Patent: Jan. 12, 2021

(54) COMPRESSION OF A VIDEO STREAM HAVING FRAMES WITH RELATIVELY HEIGHTENED QUALITY PARAMETERS ON BLOCKS ON AN IDENTIFIED POINT OF INTEREST (POI)

(71) Applicant: International Business Machines Corporation, Armonk, NY (US)

(72) Inventors: Su Liu, Austin, TX (US); Inseok Hwang, Austin, TX (US); Eric J. Rozner, Boulder, CO (US); Jinho Lee, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/159,467

(22) Filed: Oct. 12, 2018

(65) Prior Publication Data
US 2020/0120346 A1   Apr. 16, 2020

(51) Int. Cl.
*H04N 19/189*   (2014.01)
*H04N 19/124*   (2014.01)
(Continued)

(52) U.S. Cl.
CPC ......... *H04N 19/189* (2014.11); *H04N 19/114* (2014.11); *H04N 19/124* (2014.11); *H04N 19/176* (2014.11); *H04N 19/513* (2014.11)

(58) Field of Classification Search
CPC ...... H04N 19/10; H04N 19/11; H04N 19/115; H04N 19/119; H04N 19/132
(Continued)

(56) References Cited

U.S. PATENT DOCUMENTS

| 6,909,745 B1 | 6/2005 | Puri et al. |
| 9,036,693 B2 | 5/2015 | Isnardi et al. |

(Continued)

FOREIGN PATENT DOCUMENTS

WO   2003107683 A1   12/2003

OTHER PUBLICATIONS

Sastre et a. "Motion Vector Size Compensation Based Method for Very Low Bit Rate Video Coding" IEEE Transactions on Circuits and Systems for Video Technology, vol. 10, No. 7, Oct. 2000.*

(Continued)

*Primary Examiner* — Dominic D Saltarelli
(74) *Attorney, Agent, or Firm* — Zilka-Kotab. P.C.

(57) ABSTRACT

A computer-implemented method according to one embodiment includes receiving specification of a type of point of interest in video data, analyzing frames in the video data for identifying a point of interest in the frames of the specified type, adjusting quality parameters on blocks on the identified point of interest for improving a quality thereof, adjusting quality parameters on blocks not on the identified point of interest for reducing a quality thereof, and outputting a compressed video stream having the adjusted quality parameters. A computer program product for compressing video data according to another embodiment includes a computer readable storage medium having program instructions embodied therewith. The computer readable storage medium is not a transitory signal per se. The program instructions are readable and/or executable by a computer to cause the computer to perform the foregoing method.

20 Claims, 9 Drawing Sheets

(51) Int. Cl.
  *H04N 19/176* (2014.01)
  *H04N 19/513* (2014.01)
  *H04N 19/114* (2014.01)
(58) Field of Classification Search
  USPC .......................... 375/240.02, 240.03, 240.09
  See application file for complete search history.

(56) References Cited

U.S. PATENT DOCUMENTS

| | | | |
|---|---|---|---|
| 9,129,164 B2 | 9/2015 | Platonov et al. | |
| 2010/0124274 A1* | 5/2010 | Cheok | H04N 19/176 375/240.03 |
| 2012/0275509 A1* | 11/2012 | Smith | H04N 19/17 375/240.01 |
| 2012/0275511 A1 | 11/2012 | Shemer et al. | |
| 2013/0195178 A1* | 8/2013 | Price | H04N 19/176 375/240.03 |
| 2015/0042683 A1 | 2/2015 | Puri et al. | |
| 2016/0277738 A1 | 9/2016 | Puri et al. | |
| 2017/0125064 A1 | 5/2017 | Aggarwal et al. | |

OTHER PUBLICATIONS

Wikipedia, "Macroblock," Wikipedia, 2017, 3 pages, retrieved from https://en.wikipedia.org/wiki/Macroblock.

Amped Software, "Understanding the Macroblocks Filter," Amped Blog, 2016, 11 pages, retrieved from https://blog.ampedsoftware.com/2016/03/08/understanding-the-macroblocks-filter/.

Han et al., "Image Compression Using Object-Based Regions of Interest," IEEE International Conference on Image Processing, 2006, pp. 3097-3100.

Yeo et al. "How will deep learning change Internet video delivery?" ACM HotNets-XVI, Nov./Dec. 2017, 8 pages.

IBM, "When streaming video means business," IBM, 2018, 12 pages, retrieved from https://www.ibm.com/cloud-computing/solutions/video/.

IBM, "Netflix Confidently chose IBM XIV for outstanding performance," IBM, 2018, 11 pages, retrieved from https://mediacenter.ibm.com/media/Netflix+confidently+chose+IBM+XIV+for+outstanding+performance/1_f4owzphh.

Fox Sports, "FIFA World Cup," Fox Sports, 2018, 2 pages, retrieved from § https://www.foxsports.com/soccer/fifa-world-cup/highlights.

* cited by examiner

COMPRESSION OF A VIDEO STREAM HAVING FRAMES WITH RELATIVELY HEIGHTENED QUALITY PARAMETERS ON BLOCKS ON AN IDENTIFIED POINT OF INTEREST (POI)

BACKGROUND

The present invention relates to video data processing, and more specifically, this invention relates to enhancing quality parameters on blocks of in frames of a video while counter adjusting quality parameters on other blocks.

Compressed videos typically include a plurality of frames that are each encoded, compressed, and thereafter available for streaming. At a given bit rate limit, the quality of a compressed video largely depends on the dynamicity of the scene portrayed in frames of the video file. In general, when a compressed video is played for a user, the more dynamic the scenes of the video frames are, the poorer the quality of the video presented to the user. This is because conventional video encoders do not consider different portions of video file frames when encoding. Rather, the entirety of each frame is compressed in a uniform manner to achieve the target bit rate.

SUMMARY

A computer-implemented method according to one embodiment includes receiving specification of a type of point of interest in video data, analyzing frames in the video data for identifying a point of interest in the frames of the specified type, adjusting quality parameters on blocks on the identified point of interest for improving a quality thereof, adjusting quality parameters on blocks not on the identified point of interest for reducing a quality thereof, and outputting a compressed video stream having the adjusted quality parameters.

A computer program product for compressing video data according to another embodiment includes a computer readable storage medium having program instructions embodied therewith. The computer readable storage medium is not a transitory signal per se. The program instructions are readable and/or executable by a computer to cause the computer to perform the foregoing method.

A system according to another embodiment includes a processing circuit, and logic integrated with the processing circuit, executable by the processing circuit, or integrated with and executable by the processing circuit. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for compression of a video stream having frames with relatively higher quality parameters on blocks on an identified PoI.

In one general embodiment, a computer-implemented method includes receiving specification of a type of point of interest in video data, analyzing frames in the video data for identifying a point of interest in the frames of the specified type, adjusting quality parameters on blocks on the identified point of interest for improving a quality thereof, adjusting quality parameters on blocks not on the identified point of interest for reducing a quality thereof, and outputting a compressed video stream having the adjusted quality parameters.

In another general embodiment, a computer program product for compressing video data includes a computer readable storage medium having program instructions embodied therewith. The computer readable storage medium is not a transitory signal per se. The program instructions are readable and/or executable by a computer to cause the computer to perform the foregoing method.

In another general embodiment, a system includes a processing circuit, and logic integrated with the processing circuit, executable by the processing circuit, or integrated with and executable by the processing circuit. The logic is configured to perform the foregoing method.

Figure 1:
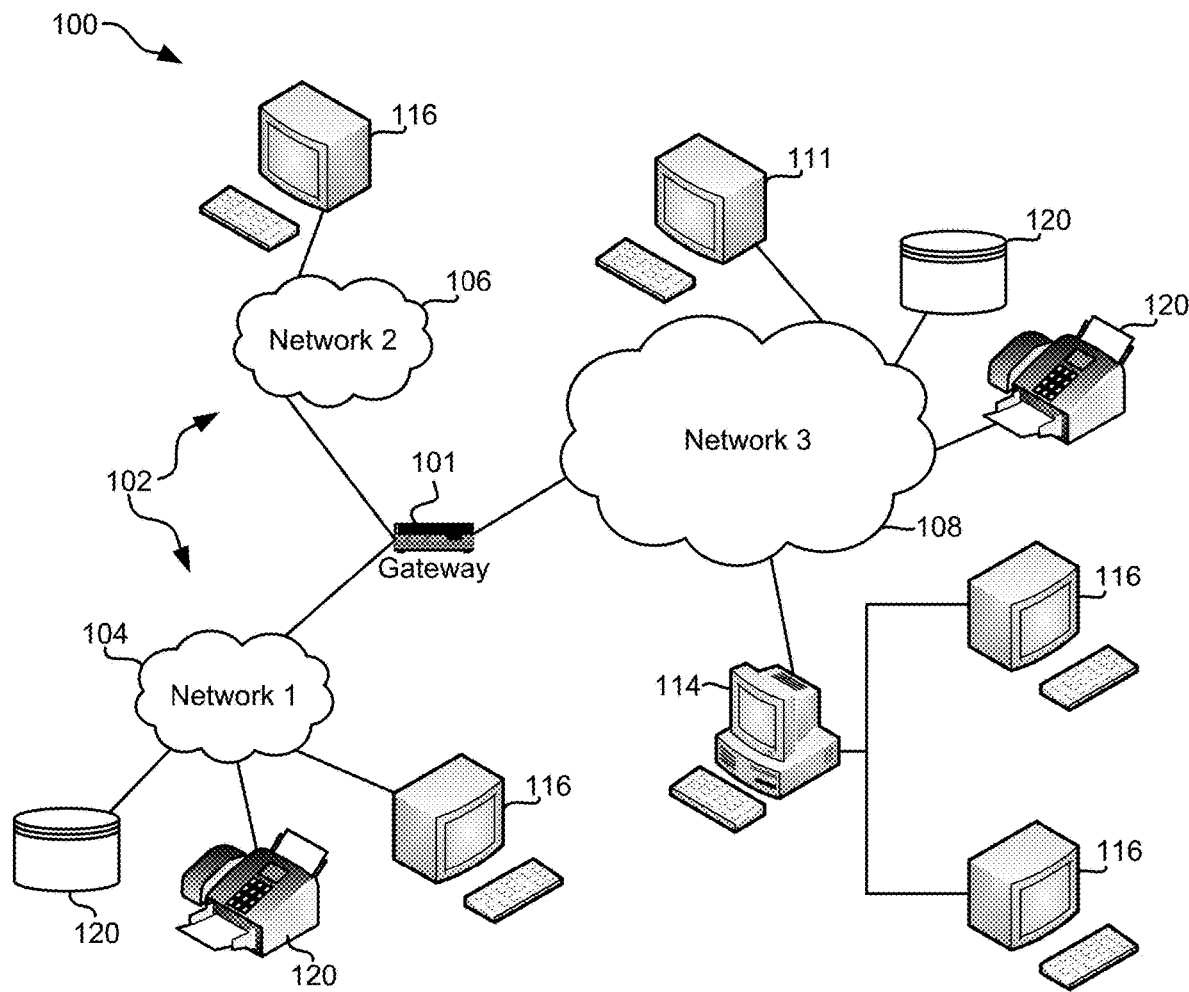
FIG. 1 is a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
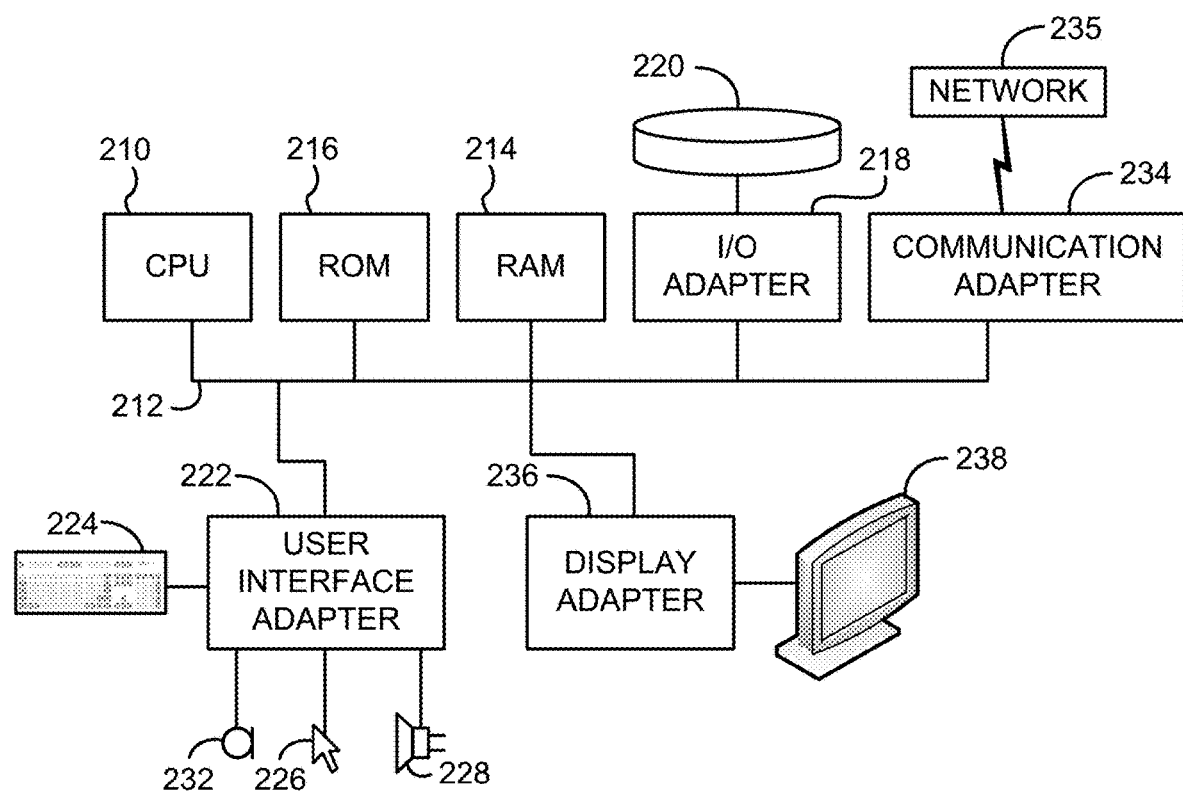
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
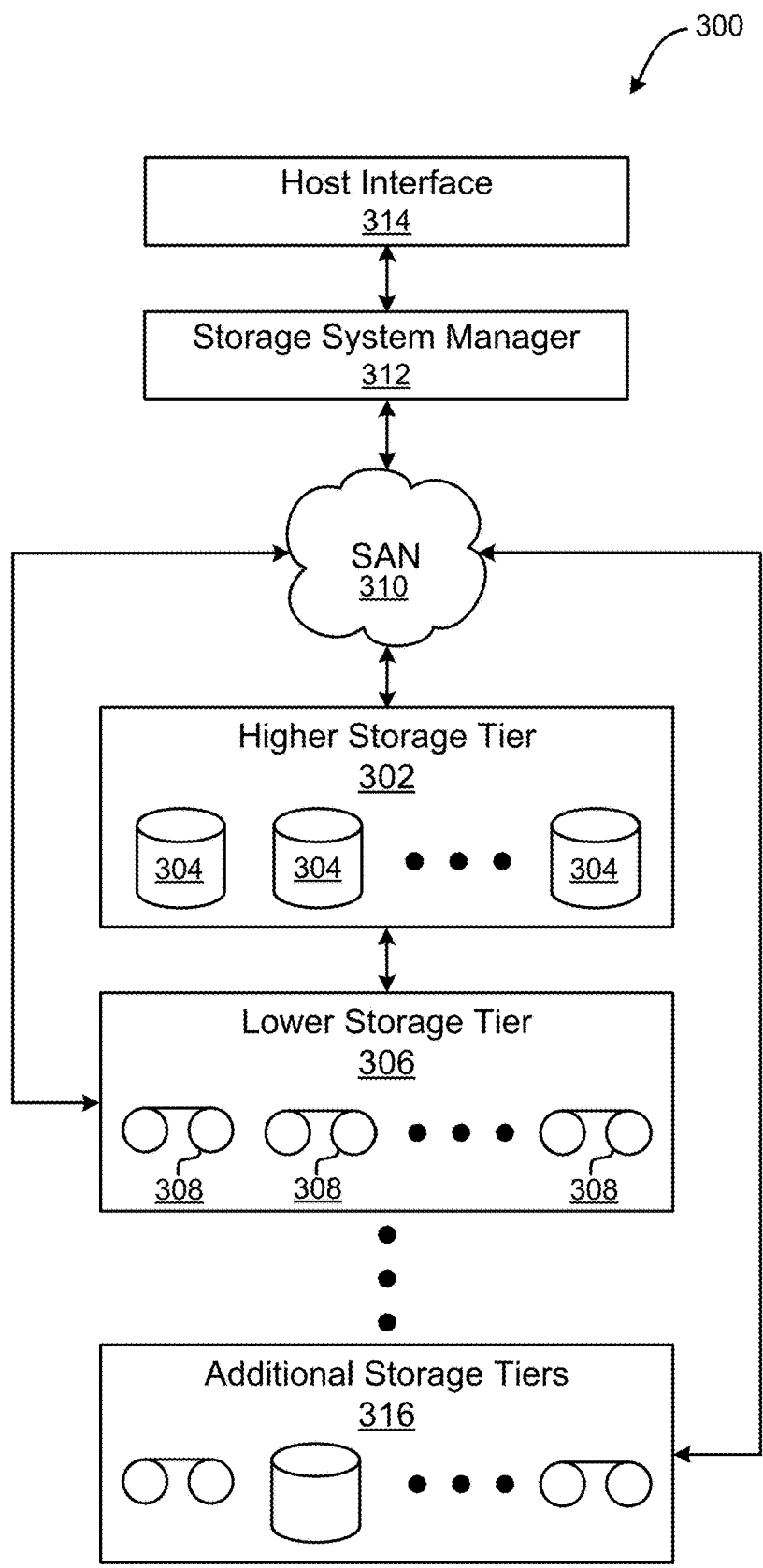
FIG. 3 is a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Video streaming services may use a tiered data storage system 300 to store content for delivery to customers. However, in an effort to prevent issues such as dropped frames, lag, etc., video data is often encoded and/or compressed to reduce the amount of data needed to be transmitted to the customer. For example, the extent of compression may be determined in part based on the available bandwidth at some point between the video encoder and the customer's portal, an estimated reliable data speed, etc. Unfortunately, where heavy compression is applied, the sharpness of the resulting video images suffers. Moreover, as noted above, the quality of a compressed video largely depends on the dynamicity of the scene portrayed in frames of the video file. In general, when a compressed video is played for a user, the more dynamic the scenes of the video frames are, the poorer the quality of the video presented to the user. This is because conventional video encoders do not consider different portions of video file frames when encoding. Rather, the entirety of each frame is compressed in a uniform manner to achieve the target bit rate.

Video frames of a video file often include a Point of Interest (PoI). A PoI is a sub-area of one or more frames that are of particular interest to a user. For example, in a music concert video, human performers are likely the major PoIs, while the stage background is less likely a PoI. The same may be said for video frames that show a sports game; the sports players are likely the major PoIs, while the ground or the audience within the frames may be considered background and therefore not a PoI.

Conventional video encoders do not discriminate between PoIs and the background of video file frames. Rather, the entirety of each frame is compressed in a uniform manner. This results in inefficient utilization of network bandwidth when streaming videos over a network at a given bit rate upper bound. To further complicate this process, when the background of a frame includes unnecessary spatial/temporal dynamicity, video encoders typically automatically allocate more information on the background area to deal with such dynamicity. Despite PoIs of such frames being more important to users viewing the frames, the PoIs are allocated less bandwidth due to the complexity of the background of the frames.

For example, assume that frames of a compressed video stream include a singer performing onstage at a concert, where a large dynamic display behind the singer also displays the singer. Also assume that the singer within the frames is determined to be a PoI. Compression of the video stream for a high definition (HD) and/or a 4K copy of such a video would be expected to include loss of detail throughout each frame, e.g., the more aggressive the compression the greater the losses are. Finer details of the frames, e.g., such as the complex dynamic display behind the singer in the current example, are typically lost during such compression, leaving only relatively coarser detail in the compressed video stream. This occurs because in terms of information theory, the finer details of frames increase a total information entropy associated with the frames. A conventional encoder that is responsible for compressing the video stream containing the frames cannot distinguish between the singer (relatively less detail) and the background (relatively greater detail). Accordingly, the encoder treats the entire video stream equally during compression, or the encoder allocates relatively more bandwidth to non-PoIs than the amount of bandwidth that is allocated to PoIs. This is problematic for at least two reasons. First, as a result of allocating a greater amount of processing resources to non-PoIs than PoIs, finer details of the frames are lost during compression. Second, as a result of allocating an equal amount of processing resources to both non-PoIs and PoIs, detail of the PoI (the singer) are lost and the viewers viewing experience is diminished.

In many approaches, the above described losses of detail are characterized by various visual artifacts, e.g., heavy losses of detail of objects of frames, blurred edges of objects of frames, block boundary artifacts, etc., being displayed around the PoIs in each frame.

For reference, various descriptions below include summarized principles of video compression usable in various embodiments described herein, e.g., see FIGS. 4-9.

Figure 4:
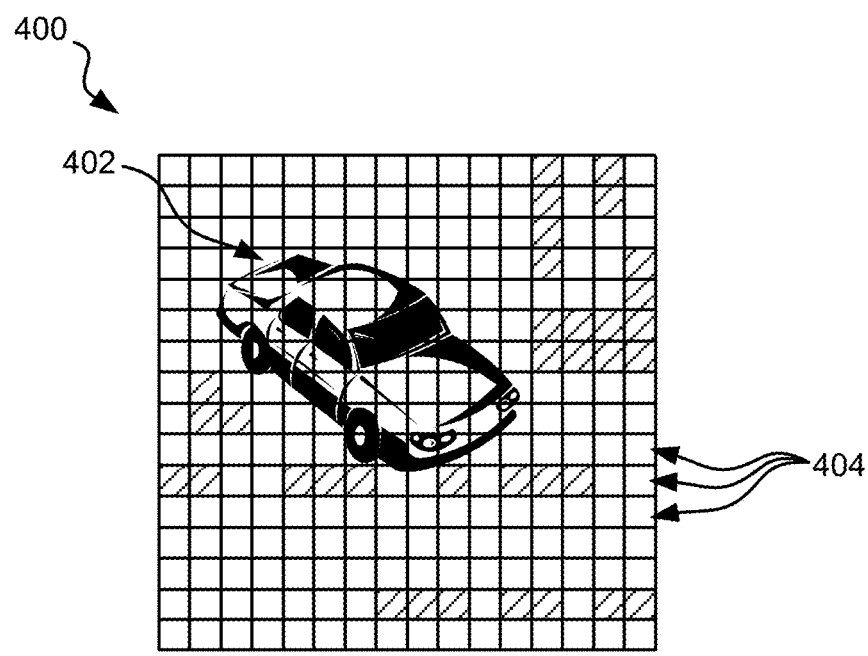
FIG. 4 is a frame of a video divided into a plurality of macroblocks in accordance with one embodiment.

Referring now to FIG. 4, a frame 400 of a video is shown according to one approach. The frame includes a vehicle 402, although in other approaches, the frame 400 may include any type and/or number of subjects, e.g., people, outdoors, animals, etc.

The frame 400 is divided, e.g., via an encoder of a computer processing the frame 400, into a plurality of macroblocks 404. Moreover, a predetermined quantization, e.g., a variable number of bits for each macroblock 404, is assigned to each macroblock 404, where each of the variable number of bits governs the available compression size of an associated macroblock 404. In other words, control of the quantization of bits allows control over the size and quality of each macroblock 404.

Figure 5:
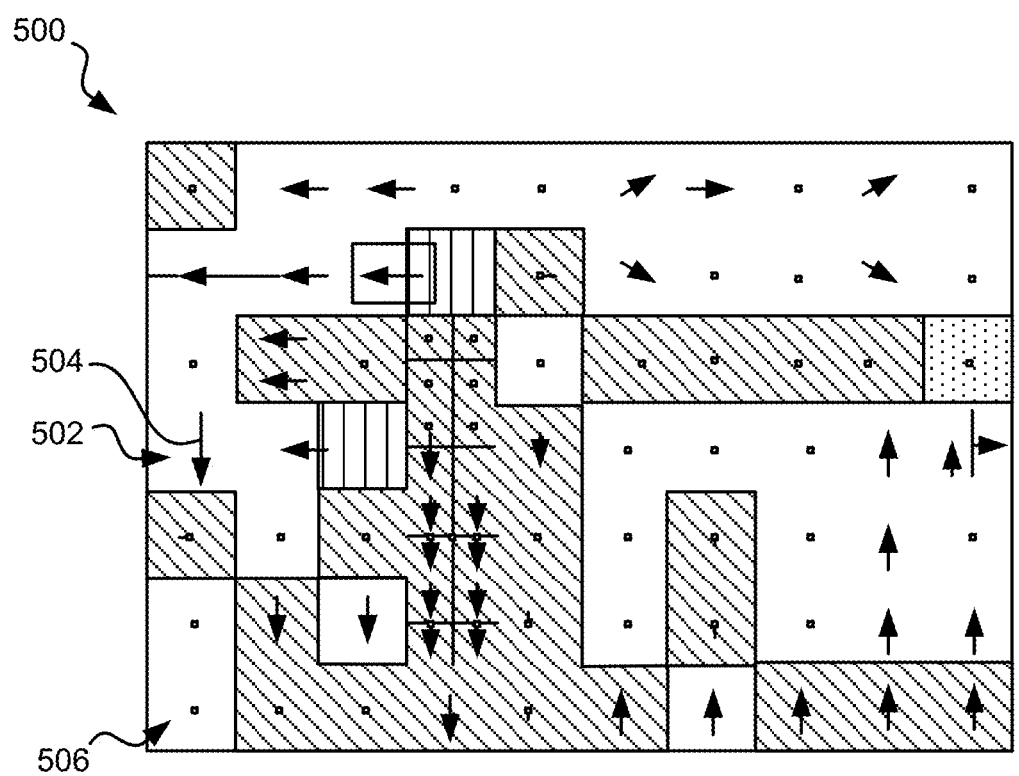
FIG. 5 is a representation of a frame of a video with motion estimation in accordance with one embodiment.

Referring now to FIG. 5, a frame 500 of a video is illustrated according to one approach. Recall that a video is a series of successive frames. Each frame of a video shares temporal locality with a preceding frame (except for a first frame of the video stream) and shares temporal locality with a proceeding frame (except for a last frame of the video).

Some video motion estimation includes estimating where a particular macroblock will be in a next (proceeding) frame, relative to a location of the particular macroblock in a most previous (preceding) frame. In doing do, specific location information is not stored for the particular macroblock for each frame of the video. Instead, motion estimation information is stored for the particular macroblock, where the motion estimation information includes a vector indicating the estimated next location of the particular macroblock. Such motion estimation information may be utilized for recovering the location of the particular macroblock from frame to frame.

Typically, such vectors are represented by a variable number of bits. The more bits that represent the vector, the more accurate the predicted location of each macroblock is. However, an increase to the number of bits used and/or stored in representing the vector also results in an increased video size. For example, the frame 500 includes a 10×7 grid of macroblocks. Some of the macroblocks include vectors, each indicating the estimated next location of an associated macroblock. For example, a first macroblock 502 includes an associated vector 504 that points in a direction indicating the estimated location of the first macroblock 502 in a next frame (not shown). Some of the macroblocks do not include an associated vector, e.g., a second macroblock 506. Accordingly, the estimated next location of the second macroblock 506 is the current location of the second macroblock, e.g., it is estimated that the second macroblock 506 will not change locations from the current location in the next frame.

Figure 6:
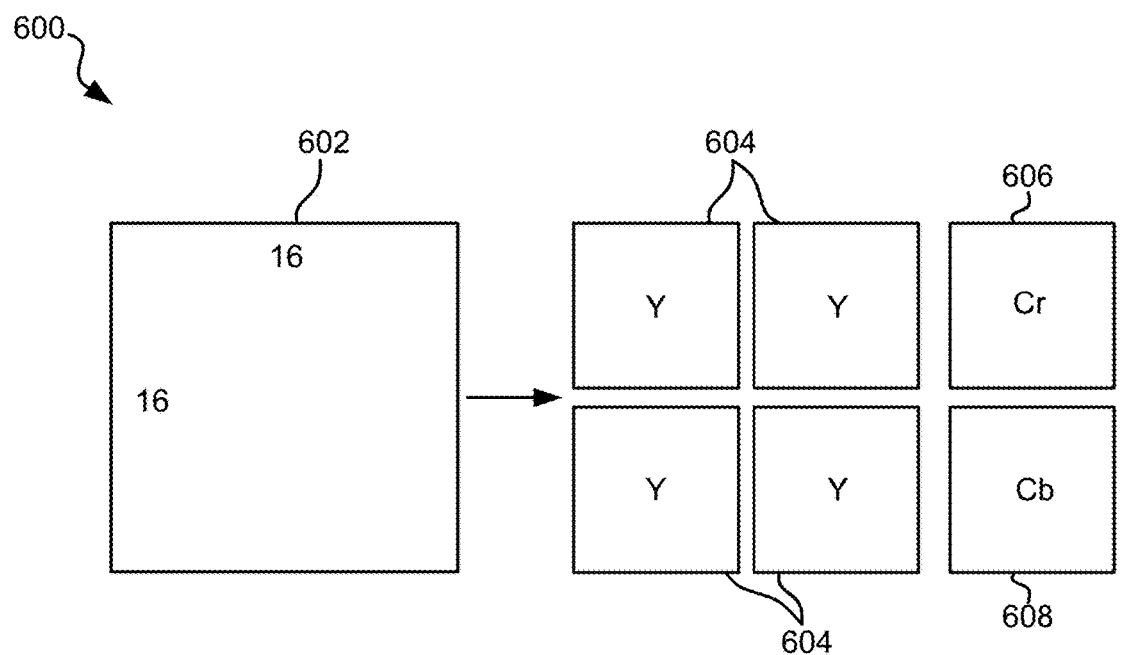
FIG. 6 is a breakdown of a macroblock into samples in accordance with one embodiment.

Referring now to FIG. 6, a representation 600 of a 16×16 pixel macroblock 602 is shown according to one approach. The macroblock 602 is broken down into transform samples, which may be input into a linear block transform. Specifically, in the current approach, the 16×16 pixel macroblock 602 is broken down into various luma (Y) samples, and various chroma (Cr and Cb) samples. Specifically, these samples may be broken down into the four Y blocks 604, one Cr block 606, and one Cb block 608.

Figure 7:
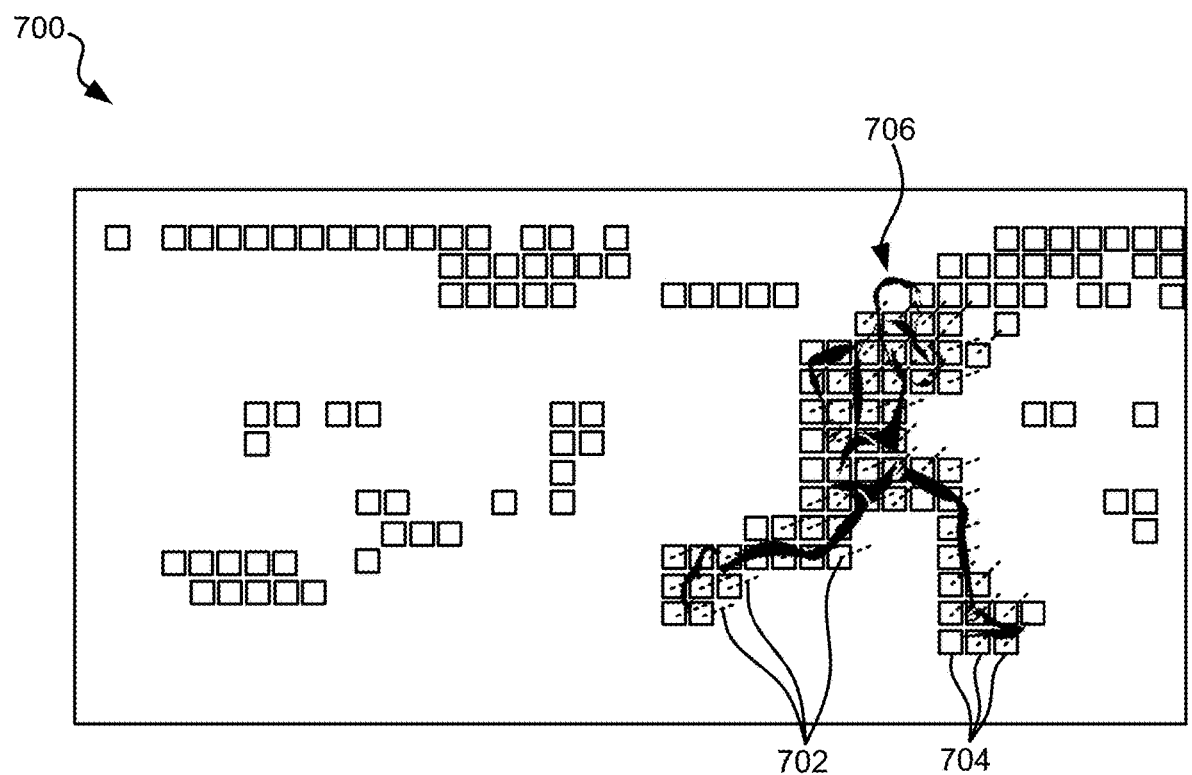
FIG. 7 is a frame of a video with motion estimation in accordance with one embodiment.

Similar to FIG. 4, FIG. 7, illustrates a frame 700 of a video. However, the frame 700 includes video motion estimation vectors 702, which each indicate the estimated next location, e.g., in a next frame (not shown), of an associated macroblock 704. For example, note that the frame 700 depicts a runner 706 that appears to be running in a right to left direction. Several of the video motion estimation vectors 702 extend from the runner 706 in a right direction. Accordingly, such vectors 702 indicate that each of the macroblocks 704 that include one of the vectors 702 will be in a further right section of a next frame (not shown).

In one approach, incorporation of H.264 standards allows motion estimation up to quarter-pixel accuracy within the frame 700, e.g., using an up to 17-digit floating-point representation.

Figure 8:
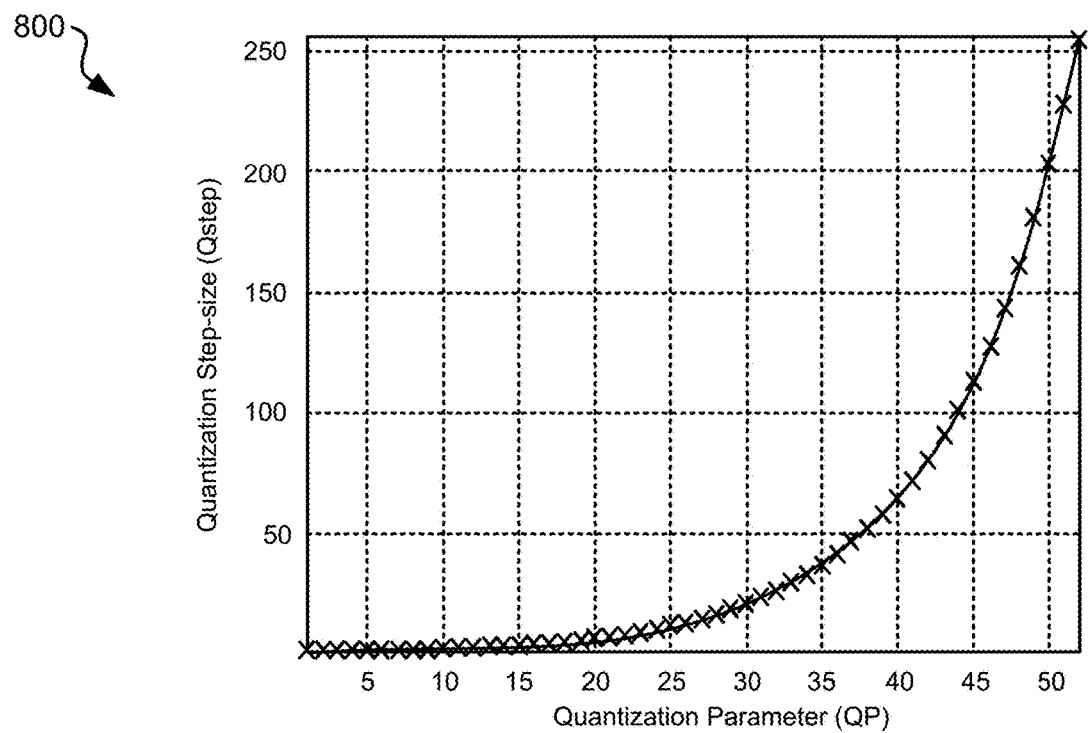
FIG. 8 is a plot contrasting quantization parameters and quantization step-size of video compression in accordance with one embodiment.

Referring now to FIG. 8, a plot 800 contrasts quantization parameters (QP) and quantization step-size (Qstep) of video compression in accordance with one exemplary embodiment. The plot 800 reiterates the previously-mentioned notion that as the number of parameters used in video compression increase, such as the number of bits stored for video motion estimation, so will the quantization step-size, e.g., the proficiency/accuracy of video compression.

Figure 9:
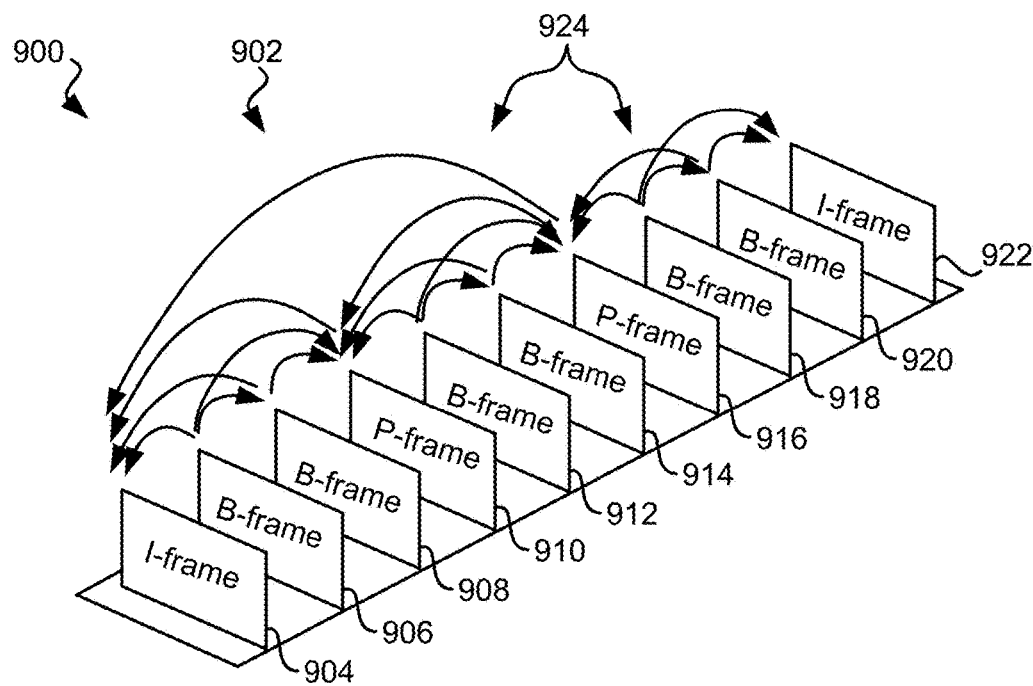
FIG. 9 is a representation of a group of pictures (GOP) in accordance with one embodiment.

FIG. 9 is a representation 900 of a GOP 902. A GOP typically specifies an ordering of frames with respect to one another.

In the present approach, the GOP 902 includes: two I-frames 904, 922; six B-frames 906-908, 912-914, and 918-920; and two P-frames 910, 916, however, other GOPs may include any number and/or type and/or arrangement of frames.

Each type of frame may include different types and/or amounts of information. For example, the I-frames 904, 922 are self-decodable, e.g., each of the I-frames 904, 922 include an amount of information stored therewith that may be utilized (by a decoder) for self-decoding.

In contrast, in the current approach, each of the B-frames 906-908, 912-914, 918-920 and the P-frames 910, 916 are dependent frames, e.g., each do not contain a sufficient amount of information stored therewith to allow for self-decoding by a decoder. Instead, at least some of the B-frames 906-908, 912-914, 918-920 and the P-frames 910, 916 depend on and utilize (borrow) information of neighboring frames for decoding (in addition to the information that the frame that is to be decoded contains). For example, for decoding the P-frame 910, information of a most proximate P-frame, e.g., P-frame 916, and information of a most proximate I-frame, e.g., I-frame 904, may be utilized (in addition to also utilizing the information that the P-frame 910 itself contains). Note that various arrows 924 of FIG. 9 illustrate relationships that various frames may utilize from neighboring frames for establishing a decodable amount of information.

Various embodiments and/or approaches described herein include adjusting quality parameters on blocks on an identified PoI for improving a quality thereof and/or adjust quality parameters on blocks not on the identified PoI for reducing a quality thereof. As a result of such adjustment(s), a compressed video steam having such blocks more clearly depict PoIs for viewers that view the video stream.

Figure 10:
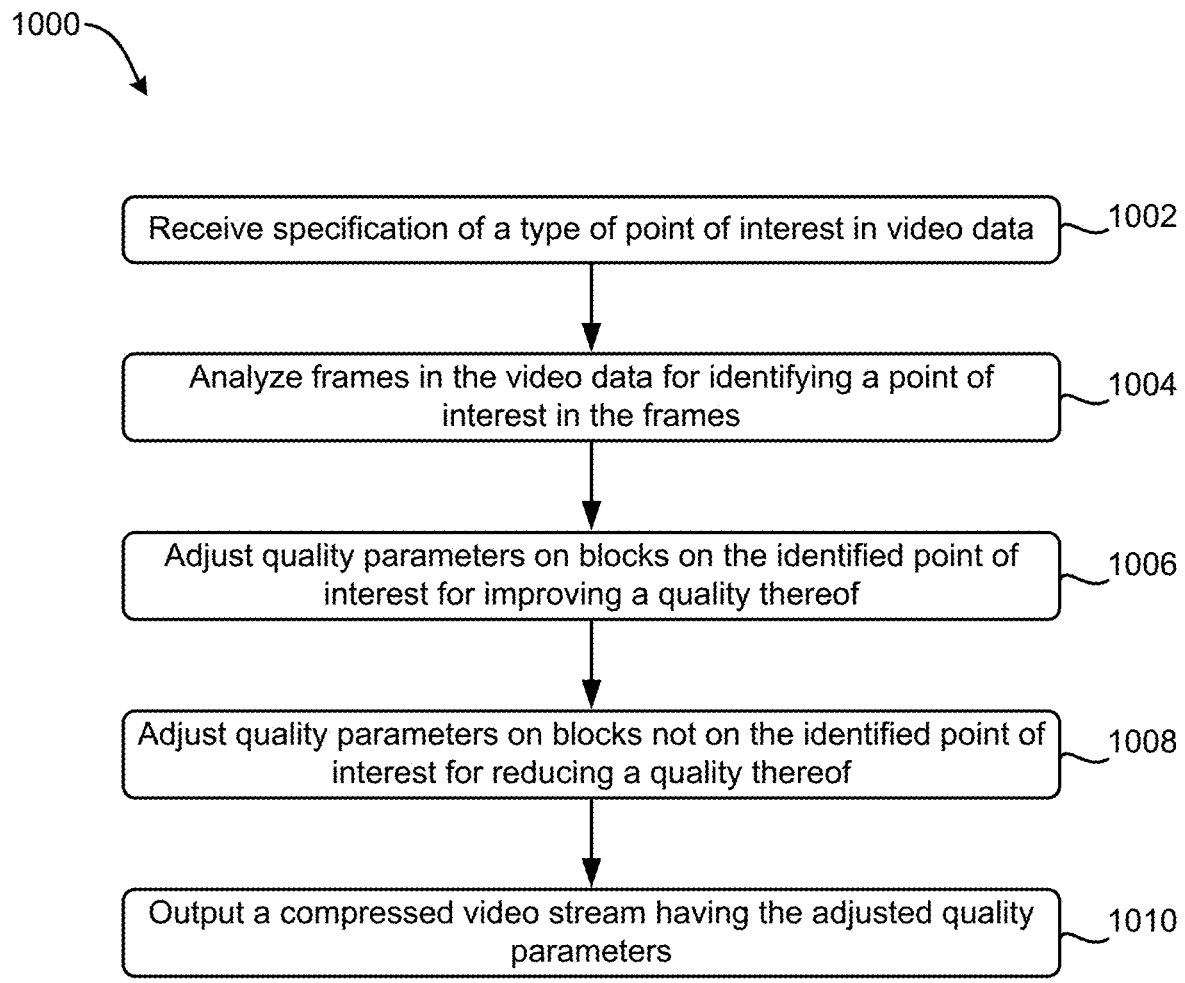
FIG. 10 is a flowchart of a method in accordance with one embodiment.

Now referring to FIG. 10, a flowchart of a method 1000 is shown according to one embodiment. The method 1000 may be performed in accordance with the present invention in any of the environments depicted in FIGS. 1-9 and 11 among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

Operation 1002 of method 1000 includes receiving specification of a type of PoI in video data. The specification of the type of PoI may be received from any source, e.g., a video producer preference, an automated agent, metadata associated with the video data, a user profile, metadata associated with the video, etc. Moreover, the PoI may be any type of PoI, e.g., an active portion of the video data (such as defined by a conglomeration of macroblocks in a frame that contain vectors), similar subjects of the video data (such as portions of frames in the video data that depict multiple common patterns), a centered portion of frames in the video data, etc.

Frames in the video data are analyzed for identifying a PoI in the frames of the specified type, e.g., see operation 1004 of method 1000. Analyzing of the frames in the video data includes using any one or more known types of frame analysis. For example, in one approach, the frames in the video data are analyzed by a known type of object detector, e.g., of an encoder. In another approach, the frames in the video data are additionally and/or alternatively analyzed by a known type of object segmenter, e.g., of an encoder. As will be described in greater detail elsewhere herein (e.g., see FIGS. 11A-11C), in some approaches the object detector may be utilized for defining a portion of the frame that includes at least one PoI. Moreover, the object segmenter may be utilized for splitting the PoIs from the rest of the scene in the frames. For example, as will also be described in greater detail elsewhere herein (e.g., see FIGS. 11A-11C), the object segmenter may be utilized for splitting a conglomeration of identified PoIs into distinct PoIs. Specifically, in one approach, the object segmenter is utilized for identifying which pixels within a defined portion of a frame relate to the PoI, and which pixels within the defined portion of the frame do not relate to the PoI.

Operation 1006 of method 1000 includes adjusting, e.g., via instructing an encoder, quality parameters on blocks on the identified PoI for improving a quality thereof. Moreover, operation 1008 of method 1000 includes adjusting, e.g., via instructing an encoder, quality parameters on blocks not on the identified PoI for reducing a quality thereof. Accordingly, the image quality of the PoI is improved, while the image quality of the surrounding scene is reduced. The relative and/or individual amounts of adjustment performed by operations 1006 and 1008 may be dependent at least in part upon the desired bit rate of the resulting video stream prepared according to the method 1000. For example, a target bit rate range for transmitting a compressed video stream may be determined (e.g., less than some maximum bit rate), and the relative adjustment amounts are selected based thereon to comply with the target bit rate range.

The quality parameters adjusted on blocks on the identified PoI include any one or more types of quality parameters. As will be understood by one of ordinary skill in the art upon reading the present descriptions, as a result of adjusting the adjustments of operation 1006 and/or operation 1008, the resulting video data is more appealing to a user that predominantly focuses on the identified PoI when viewing the frames in the video data, e.g., as a compressed video stream. This is because in some approaches, the quality parameters on blocks on the identified PoI are refined by the adjustment, e.g., have a relatively higher quality than the blocks on the identified PoI had prior to the adjusting. Moreover, this is because in some approaches as a result of adjusting quality parameters on blocks not on the identified PoI, at least some processing bandwidth, that would have otherwise been consumed processing quality parameters on blocks not on the identified PoI, are redirected and utilized for improving the quality of blocks on the identified PoI.

As will be described in further detail elsewhere herein, these adjustment(s) preferably do not increase the amount of processing bandwidth that is consumed in subsequently transmitting, analyzing and/or displaying the video data. For example, the quality parameters on blocks not on the identified PoI may be adjusted for reducing a bit rate of the video data by an amount about equal, e.g., preferably within 10%, to the amount that adjusting the quality parameters on blocks on the identified PoI increased the bit rate of the video data.

In other approaches, the quality parameters on blocks on the identified PoI are allocated an amount of processing bandwidth that allows such blocks to have a specified quality standard (4K, HD, 3D, etc., as specified by the video data), and the blocks not on the identified PoI are allocated the remaining portion of the processing bandwidth. For example, assume that the video data specifies that blocks on the identified PoI are to be encoded to have 4K quality in each frame, which consumes 80% of available processing bandwidth. Accordingly, blocks not on the identified PoI are encoded to a highest available quality that the remaining 20% of available processing bandwidth allows.

As briefly previously mentioned, in preferred approaches, the bit rate of the video data subsequent to any performed adjusting operations is very close to the bit rate of the video data prior to any performed adjusting, e.g., where "very close" is preferably defined as being within 10%. Moreover, the resulting size of the adjusted frames, e.g., the collective storage size of each of the frames after any adjusting of the quality parameters of the frames, is preferably very close to the collective storage size of the video frames would be have if conventional full frame compression were used, e.g., within 5%.

The adjusting of the quality parameters of blocks prevents the resulting video stream (see operation 1010 of method 1000) from being compressed without concern as to whether some portions of the video stream would benefit in being a higher quality than others. Recall that conventional video encoders do not discriminate between PoIs and the background of video file frames during compression and/or inadvertently tend to allocate relatively more bandwidth to non-PoIs than the amount of bandwidth that is allocated to PoI during compression. In sharp contrast, as a result of implementing various embodiments and/or approaches described herein, such as method 1000, for video data encoding/decoding, clarity of PoIs in an associated video stream is a priority. Note however that this benefit does not come at the expense of significant amounts of processing bandwidth and/or transmission bandwidth being additionally consumed. In sharp contrast, various embodiments and/or approaches described herein implement consideration of user viewing preferences (PoIs) during the allocation of processing bandwidth amongst the various quality parameters of the blocks of the video frames.

Various quality parameters, and the manner in which such quality parameters may be adjusted on blocks on the identified PoI for changing a quality thereof will now be described according to various approaches.

In one approach, the quality parameters adjusted on blocks on the identified PoI include quantization values of the blocks. For example, according to various approaches, the quantization values of the blocks on the identified PoI may include any one or more of, e.g., color quantization values of the blocks, frequency quantization values of the blocks, quantization matrices values of the blocks, etc.

For improving a quality of blocks on the identified PoI, in one approach, the adjusting includes establishing finer quantization values of the blocks on the identified PoI. Specifically, in one approach, the quantization values of the blocks on the identified PoI are adjusted to be finer than quantization values of the blocks not on the identified PoI.

The quality parameters adjusted on blocks on the identified PoI may additionally and/or alternatively include the number of frames, e.g., one, two, ten, etc., and/or the type of frames, e.g., P-frames, I-frames, B-frames, etc., that are included in each GOP of each frame of the video data. In a preferred approach, for improving a quality of blocks on the identified PoI, the adjusting includes increasing the number of P-frames in at least some of the GOP. Moreover, the numbers of P-frames of the blocks on the identified PoI are preferably adjusted to be higher than numbers of P-frames of the blocks not on the identified PoI.

In another approach, the quality parameters adjusted on blocks on the identified PoI additionally and/or alternatively include GOP sizes. For example, in one preferred approach, for improving a quality of blocks on the identified PoI, the adjusting includes decreasing the sizes of GOP. Moreover, for improving a quality of blocks on the identified PoI, GOP sizes of the blocks on the identified PoI are in one approach adjusted to be smaller than GOP sizes of the blocks not on the identified PoI.

The quality parameters adjusted on blocks on the identified PoI may additionally and/or alternatively include motion estimation. Specifically, in one preferred approach, for improving a quality of blocks on the identified PoI, the adjusting includes establishing finer motion estimation. For example, in one approach, establishing finer motion estimation includes generating and storing more motion estimation information for at least some of the blocks on the identified PoI. According to various approaches, this may include, e.g., creating a vector for blocks on the identified PoI that did not previously include a vector, creating sub-blocks and associated motion estimation information for the sub-blocks for at least some of the blocks on the identified PoI, recalculating current motion estimation information for at least some of the blocks on the identified PoI, etc.

In a preferred approach, motion estimation of the blocks on the identified PoI is adjusted to be finer than motion estimation of the blocks not on the identified PoI.

In some approaches, in different frames of the video data, the identified PoI may include a different number of blocks and/or pixels. For example, in one approach, the PoI may consume less blocks in some frames than in other frames. Moreover, in some other approaches, the PoI may consume more blocks in some frames than in other frames. Accordingly, in some approaches, the adjusting of quality parameters on blocks of the video data is performed on a frame by frame basis.

Method 1000 optionally includes encoding the video data to reflect the adjusted quality parameters of the frames, and the frames may be merged in order to establish a compressed video stream.

Operation 1010 of method 1000 includes outputting a compressed video stream having the adjusted quality parameters. The compressed video stream, having the adjusted quality parameters, may be output to any one or more locations, e.g., to storage, to a network for transmission to a device such as a display for viewing by a user, a decoder, etc.

It should be noted that although various operations of method 1000 are described with respect to blocks of frames of the video data, e.g., adjusting quality parameters on blocks, in some approaches method 1000 may additionally and/or alternatively include performing one or more of such adjustments to pixels of said blocks. For example, in one approach, in response to the object segmenter identifying which pixels of the frames relate to the PoI, method 1000 optionally includes adjusting quality parameters on pixels of blocks on the identified PoI for improving a quality thereof and/or adjusting quality parameters on pixels of blocks not on the identified PoI for reducing a quality thereof.

Figure 11A:
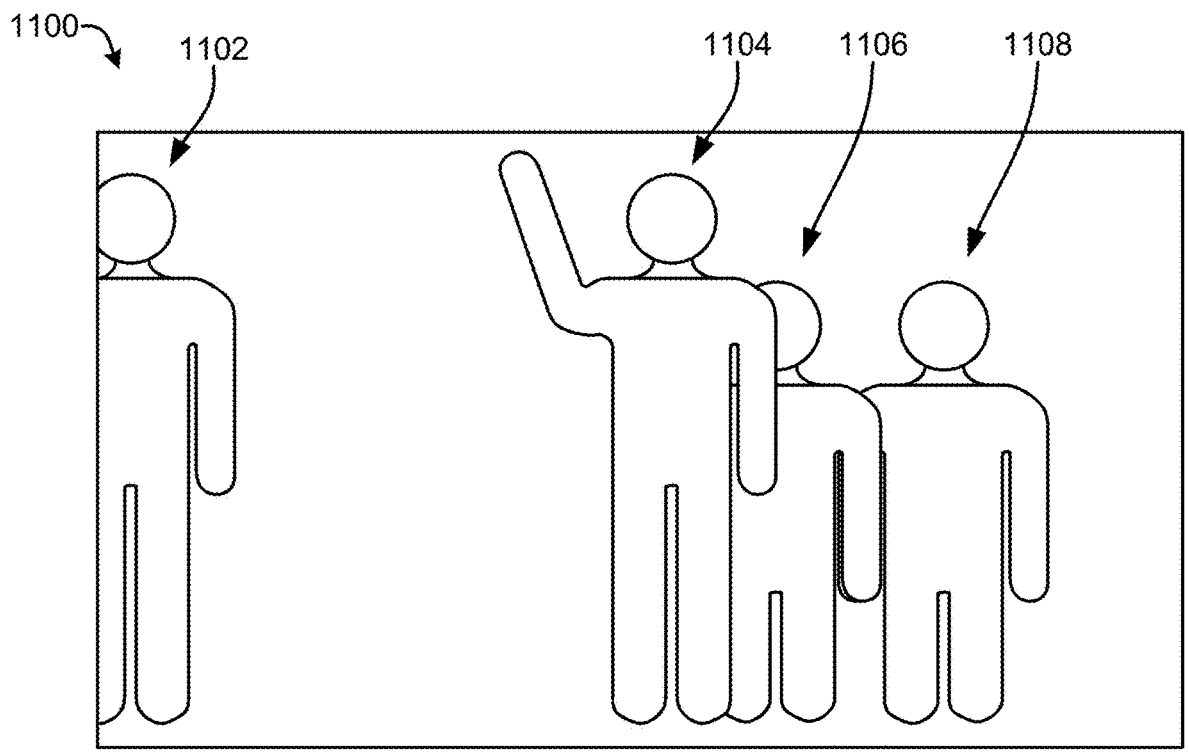
FIG. 11A is a frame of a video in accordance with one embodiment.
Figure 11B:
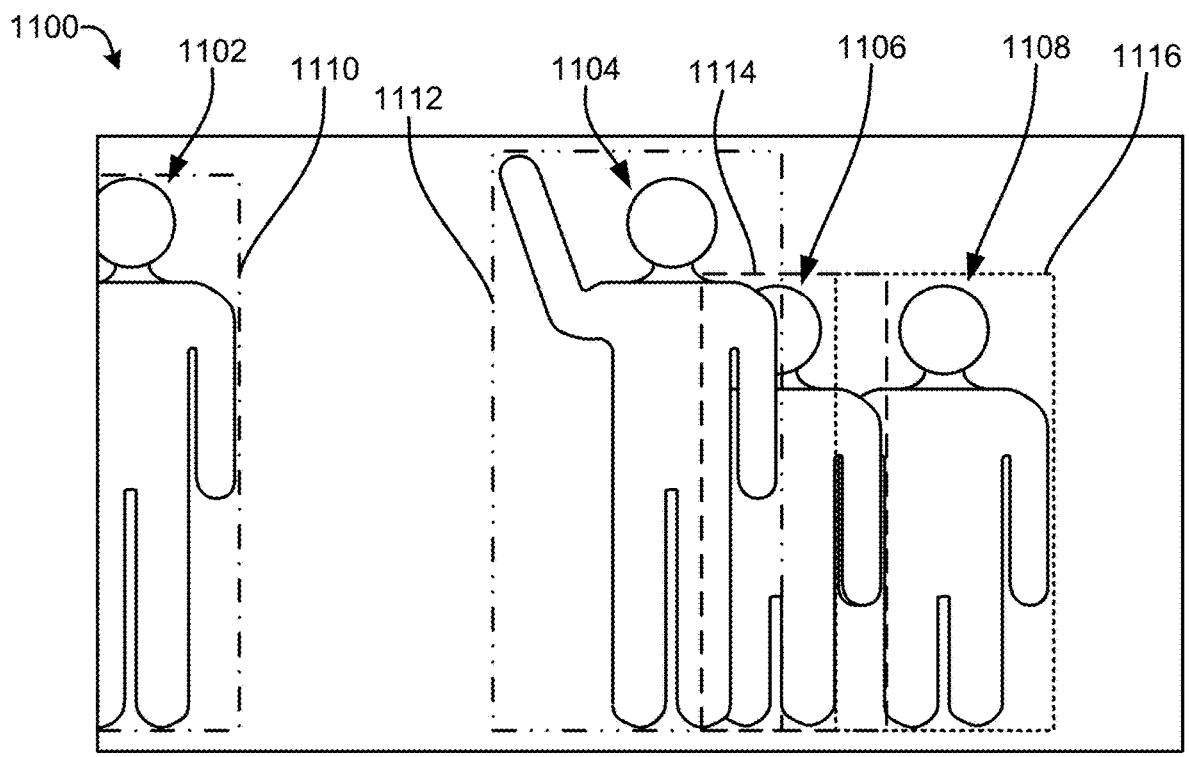
FIG. 11B is the frame of the video stream of FIG. 11A, with a plurality of identified PoIs.
Figure 11C:
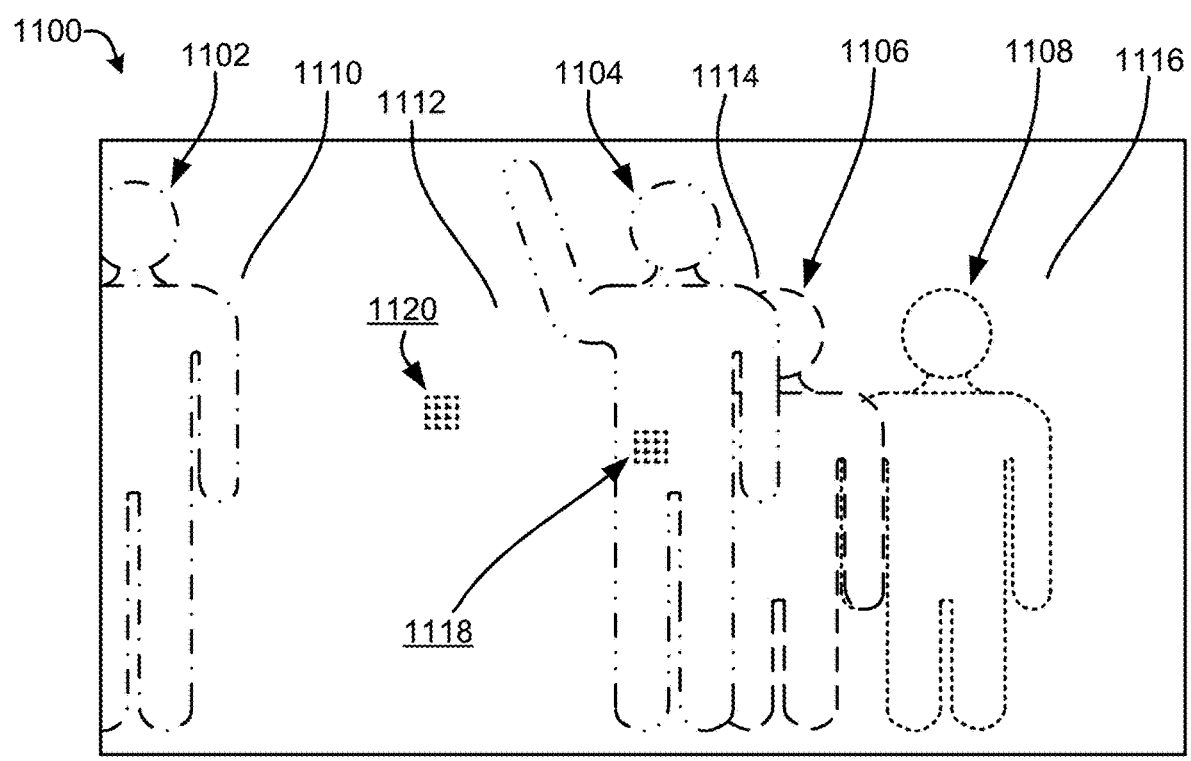
FIG. 11C is the frame of the video stream of FIGS. 11A-11B, with a plurality of identified PoIs.

FIGS. 11A-11C depict a frame 1100 of a video, in accordance with one embodiment. As an option, the present frame 1100 may be implemented in conjunction with features from any other embodiment listed herein, such as those described with reference to the other FIGS. Of course, however, such frame 1100 and others presented herein may be used in various applications and/or in permutations which may or may not be specifically described in the illustrative embodiments listed herein. Further, the frame 1100 presented herein may be used in any desired environment.

Referring first to FIG. 11A, the frame 1100 includes four people 1102, 1104, 1106, 1108.

Referring now to FIG. 11B, it may be assumed that specification of a type of PoI has been received in video data, e.g., received by a device that is processing and/or analyzing the frame 1100. In the current approach, it may also be assumed that the type of PoI includes humans, e.g., such as the people 1102, 1104, 1106, 1108. Accordingly, PoIs 1110, 1112, 1114, 1116 are identified in the frames of the video data being analyzed. In one approach the PoIs 1110, 1112, 1114, 1116 are identified using an object detector. Because some of the PoIs 1110, 1112, 1114, 1116 touch one another in the frame 1100, an object segmenter may be used to establish each of the different PoIs 1110, 1112, 1114, 1116, e.g., by splitting up POIs that contact one another in the frame 1100 (see PoIs 1112, 1114, 1116).

It should be noted that each of the PoIs 1110, 1112, 1114, 1116 include a different dashed pattern for simplified viewing purposes. However, such PoIs 1110, 1112, 1114, 1116 are preferably not visible to a user that views a compressed video stream that includes the frame 1100.

It should also be noted that, depending on the approach, each of the PoIs 1110, 1112, 1114, 1116 in the frame 1100 may be defined with different amounts of precision. For example, in FIG. 11B, the PoIs 1110, 1112, 1114, 1116 in the frame 1100 are each rectangular sections of the frame that each surround a different one of the people 1102, 1104, 1106, 1108. However, in other approaches, the size of one or more of the PoIs 1110, 1112, 1114, 1116 may be broader or narrower. For example, referring now to FIG. 11C, the segmenter determines the boundaries of the PoIs 1110, 1112, 1114, 1116 to closely contour the perimeters of the people 1102, 1104, 1106, 1108.

In one approach, quality parameters on blocks on the identified PoI are adjusted for improving a quality thereof. For example, blocks 1118 are on the identified PoI 1112, and therefore are adjusted for improving a quality thereof. Note that only a 3×3 square of blocks is illustrated on the identified PoI 1112 in FIG. 11C for simplified viewing purposes. However, in the current approach, each of the PoIs 1110, 1112, 1114, 1116 preferably include a plurality of blocks (not shown), where each plurality of blocks canvas an entire associated one of the PoIs 1110, 1112, 1114, 1116.

In another approach, quality parameters on blocks not on the identified PoI are adjusted for reducing a quality thereof. For example, blocks 1120 are not on any of the identified PoIs 1110, 1112, 1114, 1116. Accordingly, the blocks 1120 are adjusted for reducing a quality thereof. Note that only a 3×3 square of blocks is illustrated not on the identified PoIs in FIG. 11C for simplified viewing purposes. However, in the current approach, all the portions of the frame 1100 that is not on any of the identified PoIs 1110, 1112, 1114, 1116 preferably includes a plurality of blocks (not shown other than the blocks 1120).

A compressed video stream having the adjusted quality parameters may be output to any location. During playback, a user's device may decode the compressed video as usual, which will now include relatively high-quality PoIs and relatively lower-quality non-PoIs, e.g., background.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving specification of a type of point of interest in video data;
analyzing frames in the video data to identify a point of interest in the frames of the specified type,
wherein the frames in the video data are analyzed by an object detector;
adjusting quality parameters on blocks on the identified point of interest to improve a quality thereof,
wherein a first of the quality parameters adjusted on blocks on the identified point of interest includes motion estimation,
wherein adjusting the motion estimation includes increasing an amount of motion estimation bits on blocks on the identified point of interest;
adjusting quality parameters on blocks not on the identified point of interest to reduce a quality thereof; and
outputting a compressed video stream having the adjusted quality parameters.

2. The computer-implemented method of claim 1, wherein the quality parameters adjusted on blocks on the identified point of interest are additionally selected from the group consisting of: quantization values of the blocks, number of P-frames, and group-of-pictures sizes.

3. The computer-implemented method of claim 1, wherein quantization values of the blocks on the identified point of interest are adjusted to be finer than quantization values of the blocks not on the identified point of interest.

4. The computer-implemented method of claim 1, wherein numbers of P-frames of the blocks on the identified point of interest are adjusted to be higher than numbers of P-frames of the blocks not on the identified point of interest.

5. The computer-implemented method of claim 1, wherein group-of-pictures sizes of the blocks on the identified point of interest are adjusted to be smaller than group-of-pictures sizes of the blocks not on the identified point of interest.

6. The computer-implemented method of claim 1, wherein motion estimation of the blocks on the identified point of interest is adjusted to be finer than motion estimation of the blocks not on the identified point of interest.

7. The computer-implemented method of claim 1, wherein the quality parameters on blocks not on the identified point of interest are adjusted to reduce a bit rate of the video data by an amount about equal to the amount that adjusting the quality parameters on blocks on the identified point of interest increased the bit rate of the video data.

8. The computer-implemented method of claim 1, wherein the frames in the video data are additionally analyzed by an object segmenter to identify the point of interest in the frames of the specified type.

9. The computer-implemented method of claim 1,
wherein the specified type of point of interest is a type of subject in at least some frames of the video data,
wherein the type of subject in the at least some frames of the video data includes outdoors,
wherein the specified type of point of interest is based on a user profile,
wherein quantization values of the blocks on the identified point of interest are adjusted to be finer than quantization values of the blocks not on the identified point of interest.

10. A computer program product for compressing to compress video data, the computer program product comprising a computer readable storage medium having program instructions embodied therewith, wherein the computer readable storage medium is not a transitory signal per se, the program instructions readable and/or executable by a computer to cause the computer to perform a method comprising:
receiving, by the computer, specification of a type of point of interest in video data,
wherein the specified type of point of interest is a type of subject in at least some frames of the video data,
wherein the type of subject in the at least some frames of the video data includes outdoors,
logically divide, by the computer, frames in the video data into a plurality of blocks;
analyzing, by the computer, frames in the video data to identify a point of interest in the frames of the specified type;
adjusting, by the computer, quality parameters on the blocks on the identified point of interest to improve a quality thereof,
wherein adjusting the quality parameters on the blocks on the identified point of interest to improve the quality thereof includes increasing a number of bits that represent a vector of the identified point of interest;
adjusting, by the computer, quality parameters on the blocks not on the identified point of interest to reduce a quality thereof; and
outputting, by the computer, a compressed video stream having the adjusted quality parameters.

11. The computer program product of claim 10, wherein the quality parameters adjusted on blocks on the identified point of interest are selected from the group consisting of: quantization values of the blocks, number of P-frames, group-of-pictures sizes, and motion estimation.

12. The computer program product of claim 10, wherein quantization values of the blocks on the identified point of interest are adjusted to be finer than quantization values of the blocks not on the identified point of interest.

13. The computer program product of claim 10, wherein numbers of P-frames of the blocks on the identified point of interest are adjusted to be higher than numbers of P-frames of the blocks not on the identified point of interest.

14. The computer program product of claim 10, wherein group-of-pictures sizes of the blocks on the identified point of interest are adjusted to be smaller than group-of-pictures sizes of the blocks not on the identified point of interest.

15. The computer program product of claim 10,
wherein motion estimation of the blocks on the identified point of interest is adjusted to be finer than motion estimation of the blocks not on the identified point of interest,
wherein the vector points in a first direction from a block of a first frame of the video data that indicates an estimated location of an associated block in a second frame of the video data,
wherein the first frame precedes the second frame.

16. The computer program product of claim 10, wherein the quality parameters on blocks not on the identified point of interest are adjusted to reduce a bit rate of the video data by an amount about equal to the amount that adjusting the quality parameters on blocks on the identified point of interest increased the bit rate of the video data.

17. The computer program product of claim 10, wherein the specified type of point of interest is based on a user profile.

18. The computer program product of claim 10,
wherein the frames in the video data are analyzed by an object detector to identify the point of interest in the frames of the specified type,
wherein the vector points in a first direction from a block of a first frame of the video data that indicates an estimated location of an associated block in a second frame of the video data,
wherein the first frame precedes the second frame,
wherein adjusting the quality parameters on blocks on the identified point of interest includes increasing an amount of motion estimation bits on blocks on the identified point of interest.

19. A system, comprising:
a processing circuit; and
logic integrated with the processing circuit, executable by the processing circuit, or integrated with and executable by the processing circuit, the logic being configured to cause the processing circuit to:
receive, by the processing circuit, specification of a type of point of interest in video data, wherein the specified type of point of interest is a type of subject in at least some frames of the video data;
logically divide, by the processing circuit, frames in the video data into a plurality of blocks;
analyze, using an object detector and/or an object segmenter of the processing circuit, the frames in the video data to identify a point of interest in the frames of the specified type;
adjust, by the processing circuit, quality parameters on the blocks on the identified point of interest to improve a quality thereof,
wherein a first of the quality parameters adjusted on blocks on the identified point of interest includes motion estimation,
wherein adjusting the motion estimation includes increasing an amount of motion estimation bits on blocks on the identified point of interest;
adjust, by the processing circuit, quality parameters on the blocks not on the identified point of interest to reduce a quality thereof; and
output, by the processing circuit, a compressed video stream having the adjusted quality parameters.

20. The system of claim 19,
wherein adjusting the quality parameters on blocks on the identified point of interest includes adjusting quality parameters on pixels of the blocks on the identified point of interest,
wherein adjusting the quality parameters on blocks not on the identified point of interest includes adjusting quality parameters on pixels of the blocks not on the identified point of interest,
wherein the type of subject in the at least some frames of the video data includes outdoors.

* * * * *